United States Patent
Liu (10) Patent No.: US 9,627,661 B2
(45) Date of Patent: Apr. 18, 2017

(54) BATTERY ASSEMBLY, ELECTRONIC CIGARETTE, AND METHOD FOR ASSEMBLING THE BATTERY ASSEMBLY

(71) Applicant: Qiuming Liu, Shenzhen (CN)

(72) Inventor: Qiuming Liu, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 334 days.

(21) Appl. No.: 14/460,103

(22) Filed: Aug. 14, 2014

(65) Prior Publication Data

US 2015/0200385 A1 Jul. 16, 2015

(30) Foreign Application Priority Data

Jan. 14, 2014 (WO) ................ PCT/CN2014/070608

(51) Int. Cl.
*H02J 7/00* (2006.01)
*A24F 11/00* (2006.01)
(Continued)

(52) U.S. Cl.
CPC ......... *H01M 2/0404* (2013.01); *A24F 47/008* (2013.01); *H01M 10/425* (2013.01); *H01M 2220/30* (2013.01); *Y10T 29/4911* (2015.01)

(58) Field of Classification Search
CPC ...... A24F 47/008; A24F 47/00; H02J 7/0044; H01M 2/1055

(Continued)

(56) References Cited

U.S. PATENT DOCUMENTS 6,327,994 B1 * 12/2001 Labrador ............... B01D 61/10
114/382
8,314,591 B2 * 11/2012 Terry .................... A24F 47/008
320/114

(Continued)

FOREIGN PATENT DOCUMENTS

CN 202262413 U 6/2012
CN 203182011 U 9/2013

(Continued)

OTHER PUBLICATIONS

International Search Report and Written Opinion for International Application No. PCT/CN2014/070608 dated Oct. 17, 2014.

*Primary Examiner* — M'Baye Diao (57) ABSTRACT

The present application discloses a battery assembly, an electronic cigarette using the battery assembly, and a method for assembling the battery assembly. The battery assembly is configured to be connected with an atomizing assembly to form the electronic cigarette. The battery assembly comprises a battery sleeve, a battery, an end cover, a control module, and an electronic wire. The end cover defines an assembling hole configured to mount the control module therein, and the end cover further defines at least one wire holding groove in an inner wall of the assembling hole and configured to enable the electronic wire to pass through. The wire holding groove can effectively prevent the electronic wire from being squeezed and scraped by the battery sleeve and the end cover. Open-circuit and short-circuit of the circuit in the battery assembly can be avoided, and the product quality of the battery assembly can be improved.

19 Claims, 10 Drawing Sheets

(51) Int. Cl.
*A24F 13/00* (2006.01)
*A61M 15/06* (2006.01)
*H01M 2/04* (2006.01)
*H01M 10/42* (2006.01)
*A24F 47/00* (2006.01)

(58) Field of Classification Search
USPC .............. 320/114; 131/328, 329; 128/202.21
See application file for complete search history.

(56) References Cited

U.S. PATENT DOCUMENTS

| | | | |
|---|---|---|---|
| 8,365,742 B2* | 2/2013 | Hon | A24F 47/008 128/202.21 |
| 8,757,147 B2* | 6/2014 | Terry | A24F 47/008 128/202.21 |
| 9,301,549 B2* | 4/2016 | Liu | A24F 47/008 |
| 2011/0277764 A1* | 11/2011 | Terry | A24F 47/008 128/203.26 |
| 2012/0208050 A1* | 8/2012 | Chen | H01M 2/1077 429/7 |
| 2013/0153698 A1* | 6/2013 | Zhang | A47J 42/06 241/100 |
| 2013/0176401 A1* | 7/2013 | Monari | H04N 5/2252 348/47 |
| 2014/0060524 A1* | 3/2014 | Liu | A24F 47/008 128/200.14 |
| 2014/0196718 A1 | 7/2014 | Li et al. | |
| 2015/0013701 A1* | 1/2015 | Liu | A24F 47/008 131/329 |
| 2015/0027460 A1* | 1/2015 | Liu | A24F 47/008 131/329 |
| 2015/0068543 A1* | 3/2015 | Liu | A24F 47/002 131/329 |
| 2015/0101623 A1* | 4/2015 | Liu | H05B 1/0244 131/328 |
| 2016/0095352 A1* | 4/2016 | Liu | H01M 2/34 131/329 |

FOREIGN PATENT DOCUMENTS

| | | |
|---|---|---|
| CN | 203353687 U | 12/2013 |
| CN | 203353689 U | 12/2013 |
| CN | 203659945 U | 6/2014 |

* cited by examiner

BATTERY ASSEMBLY, ELECTRONIC CIGARETTE, AND METHOD FOR ASSEMBLING THE BATTERY ASSEMBLY

CROSS REFERENCE TO RELATED APPLICATIONS

This application claims priority to International Application No. PCT/CN2014/070608, filed Jan. 14, 2014, which is hereby incorporated herein in its entirety by reference.

FIELD OF THE INVENTION

The present invention relates to the field of daily electronic products, and more particularly, relates to a battery assembly, an electronic cigarette, and a method for assembling the battery assembly.

BACKGROUND OF THE INVENTION

Figure 1:
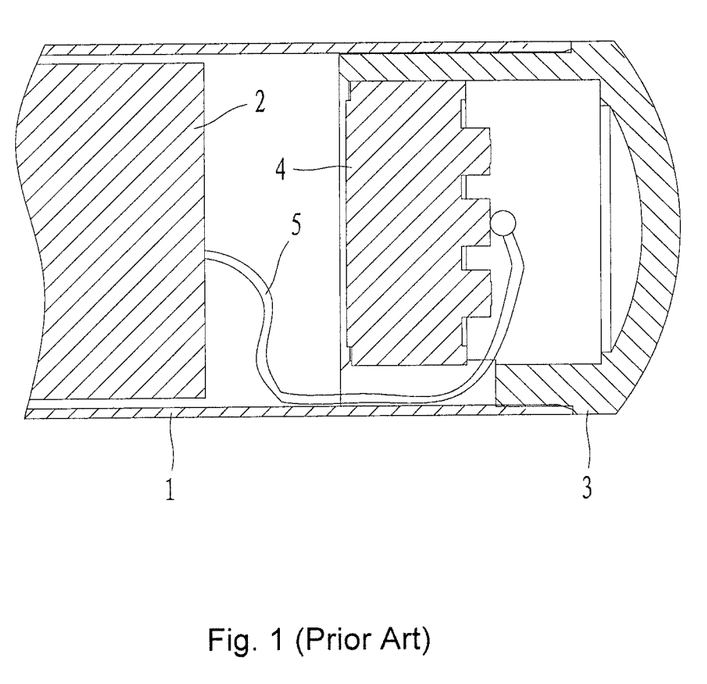
FIG. 1 is a structural diagram of a battery assembly in the prior art.
Figure 2:
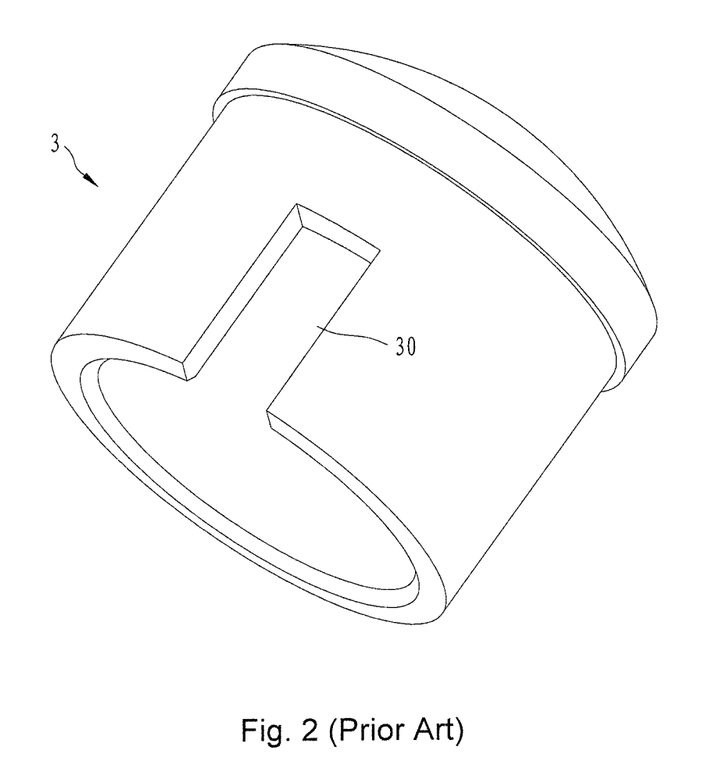
FIG. 2 is a perspective structural diagram of an end cover of the battery assembly shown in FIG. 1.

An electronic cigarette usually includes a battery assembly and an atomizing assembly. As shown in FIG. 1 and FIG. 2, a battery assembly in the prior art includes a battery sleeve 1, a battery 2 mounted inside the battery sleeve 1, an end cover 3 mounted on one end of the battery sleeve 1, a control module 4 configured to control an atomizing assembly 10 to work, and an electronic wire 5 connected between the battery 2 and the control module 4. The control module 4 is mounted in the end cover 3, and a connecting pin of the control module 4 is positioned on an end of the control module 4 that is away from the battery 2. An end of the end cover 3 near the battery sleeve 1 defines a connecting groove 30, one end of the electronic wire 5 is electrically connected to an electrode of the battery 2, and the other end of the electronic wire 5 passes through the connecting groove 30 and is electrically connected to the connecting pin of the control module 4. However, in the assembly process of pressing the end cover 3 into the battery sleeve 1, the electronic wire 5 may deviate from the connecting groove 30 and be clamped in the gap between the battery sleeve 1 and the end cover 3. Thus, the electronic wire 5 may be scraped or broken, which may cause open-circuit or short-circuit in the battery assembly and adversely affect normal use of the electronic cigarette using the battery assembly.

SUMMARY OF THE INVENTION

The technical problem to be solved by the present invention is to provide a battery assembly, an electronic cigarette using the battery assembly, and a method for assembling the battery assembly which can effectively avoid damage of the electronic wire, aiming at the defect in the prior art that the end cover of the battery assembly may scrape or break the electronic wire in the assembly process of pressing the end cover into the battery sleeve.

A technical solution of the present application configured to solve the aforementioned technical problem is to provide a battery assembly configured to be connected with an atomizing assembly to form an electronic cigarette. The battery assembly comprises a battery sleeve, a battery mounted inside the battery sleeve, an end cover mounted on an end of the battery sleeve, a control module configured to control the atomizing assembly to work, and an electronic wire electrically connected between the battery and the control module. The end cover defines an assembling hole configured to mount the control module therein, and the end cover further defines at least one wire holding groove in an inner wall of the assembling hole and configured to enable the electronic wire to pass through.

In the battery assembly of the present application, the end cover includes an end cover body, and at least one force reducing groove defined on an end of the end cover body near the battery, and the assembling hole is defined in the end of the end cover body near the battery.

In the battery assembly of the present application, the end cover further includes a limiting portion protruding from an inner wall of an end of the assembling hole that is away from the battery, an end of the control module that is away from the battery abuts against the limiting portion, and the wire holding groove axially runs through the limiting portion along the inner wall of the assembling hole.

In the battery assembly of the present application, a distance between an end surface of the end cover near the battery and an end surface of the control module near the battery is more than or equal to 1 mm.

In the battery assembly of the present application, the wire holding groove is a rectangular groove, a circular groove, or a reniform groove.

In the battery assembly of the present application, the end cover includes an end cover body mounted on an end of the battery sleeve, the end cover body includes an insertion portion mounted inside the battery sleeve and an extending portion positioned outside the battery sleeve, and the assembling hole is defined in an end of the insertion portion near the battery.

In the battery assembly of the present application, the insertion portion is substantially a cylindrical structure, and the assembling hole is substantially a circular hole; a central axis of the assembling hole deviates from a central axis of the insertion portion, and the wire holding groove is defined in a part of an inner wall of the assembling hole that has the shortest distance from the central axis of the insertion portion.

In the battery assembly of the present application, the end cover further includes at least one first air groove defined in an outer sidewall of the insertion portion and at least one second air groove defined in an outer sidewall of the extending portion, and the first air groove and the second air groove communicate with each other to form a channel configured to allow air to flow though.

In the battery assembly of the present application, the channel formed by the first air groove and the second air groove is substantially L-shaped.

The present application further provides an electronic cigarette comprising a battery assembly and an atomizing assembly. The battery assembly includes a battery sleeve, a battery mounted inside the battery sleeve, an end cover mounted on an end of the battery sleeve, a control module configured to control the atomizing assembly to work, and an electronic wire electrically connected between the battery and the control module. The end cover defines an assembling hole configured to mount the control module therein, and the end cover further defines at least one wire holding groove in an inner wall of the assembling hole and configured to enable the electronic wire to pass through.

In the electronic cigarette of the present application, the atomizing assembly includes an atomizing sleeve integrally formed with the battery sleeve or detachably connected with the battery sleeve, and the end cover is mounted on an end of the battery sleeve that is away from the atomizing sleeve.

In the electronic cigarette of the present application, the end cover includes an end cover body, and at least one force reducing groove defined on an end of the end cover body near the battery, and the assembling hole is defined in the end of the end cover body near the battery.

In the electronic cigarette of the present application, the end cover further includes a limiting portion protruding from an inner wall of an end of the assembling hole that is away from the battery, an end of the control module that is away from the battery abuts against the limiting portion, and the wire holding groove axially runs through the limiting portion along the inner wall of the assembling hole.

In the electronic cigarette of the present application, a distance between an end surface of the end cover near the battery and an end surface of the control module near the battery is more than or equal to 1 mm.

In the electronic cigarette of the present application, the wire holding groove is a rectangular groove, a circular groove, or a reniform groove.

In the electronic cigarette of the present application, the end cover includes an end cover body mounted on an end of the battery sleeve, the end cover body includes an insertion portion mounted inside the battery sleeve and an extending portion positioned outside the battery sleeve, and the assembling hole is defined in an end of the insertion portion near the battery.

In the electronic cigarette of the present application, the insertion portion is substantially a cylindrical structure, and the assembling hole is substantially a circular hole; a central axis of the assembling hole deviates from a central axis of the insertion portion, and the wire holding groove is defined in a part of an inner wall of the assembling hole that has the shortest distance from the central axis of the insertion portion.

In the electronic cigarette of the present application, the end cover further includes at least one first air groove defined in an outer sidewall of the insertion portion and at least one second air groove defined in an outer sidewall of the extending portion, and the first air groove and the second air groove communicate with each other to form a channel to allow air to flow through.

In the electronic cigarette of the present application, the channel formed by the first air groove and the second air groove is substantially L-shaped.

Based on the aforementioned battery assembly, the present application further provides a method for assembling the battery assembly. The method comprises the following steps:

S1: connecting the electronic wire between the battery and the control module;

S2: aligning the electronic wire with the wire holding groove, and inserting the control module into the assembling hole;

S3: the assembled battery, the electronic wire, the control module, and the end cover are assembled inside the battery sleeve sequentially.

The following beneficial effects will be achieved when implementing the battery assembly, the electronic cigarette, and the method for assembling the battery assembly of the present application: the end cover of the battery assembly has a structure that includes at least one wire holding groove defined in the inner wall of the assembling hole and configured to enable the electronic wire to pass through. In the assembly process of the end cover, the wire holding groove is used to receive the electronic wire and can effectively prevent the electronic wire from being squeezed and scraped by the battery sleeve and the end cover. In this way, open-circuit and short-circuit of the circuit in the battery assembly can be avoided, and the product quality of the battery assembly can be improved.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

In order to make the technical features, purpose and the effect of the present invention more clearly, the preferred specific embodiments of the present invention will be described with reference to the drawings.

Figure 3:
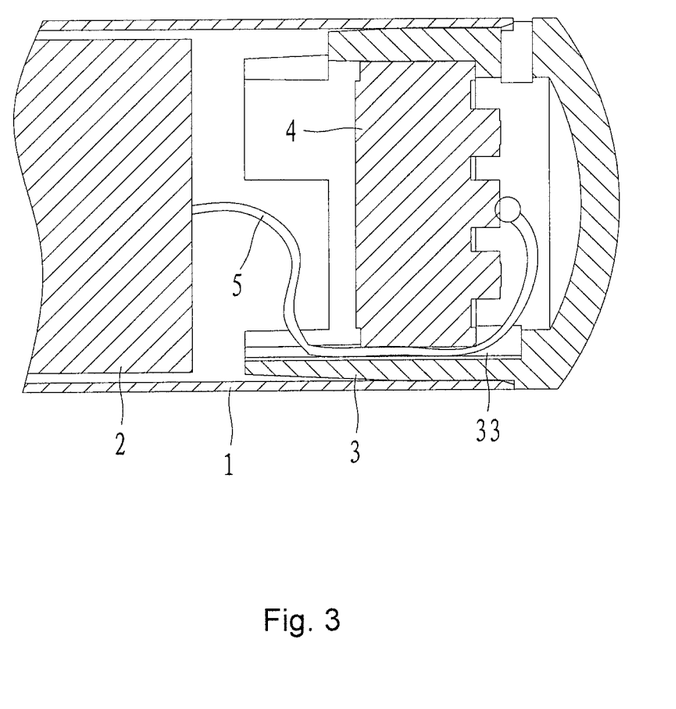
FIG. 3 is a structural diagram of a battery assembly according to a first preferred embodiment of the present application.
Figure 4:
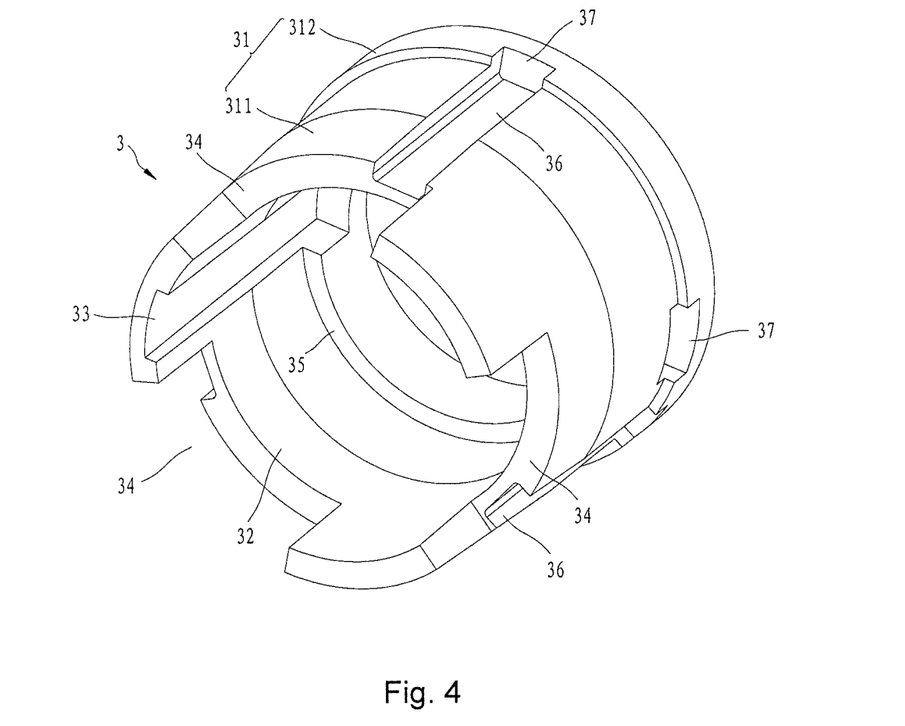
FIG. 4 is a perspective structural diagram of an end cover of the battery assembly shown in FIG. 3.
Figure 9:
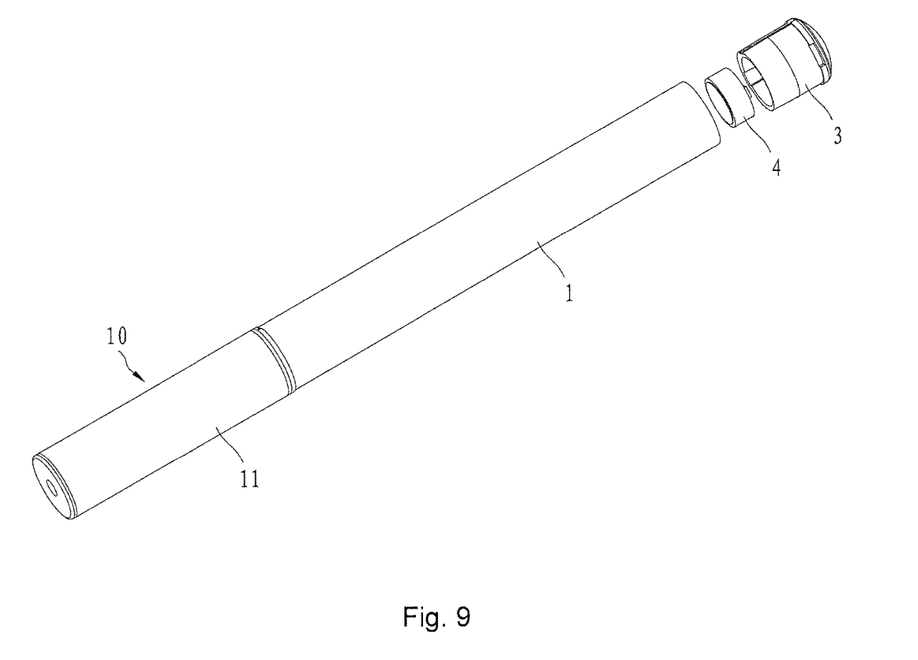
FIG. 9 is an exploded view of an electronic cigarette according to one preferred embodiment of the present application.

As shown in FIG. 3, FIG. 4, and FIG. 9, a first preferred embodiment of the present application provides a battery assembly, which is configured to be connected with an atomizing assembly 10 to form an electronic cigarette. The battery assembly includes a battery sleeve 1, a battery 2, an end cover 3, a control module 4, and an electronic wire 5. The battery sleeve 1 is substantially a hollow cylindrical structure. The battery 2 is mounted inside the battery sleeve 1, and the end cover 3 is mounted on an end of the battery sleeve 1. The control module 4 is configured to control the atomizing assembly 10 to work. The electronic wire 5 is connected between the battery 2 and the control module 4 to form an electrical connection between the battery 2 and the control module 4.

As shown in FIG. 3 and FIG. 4, the end cover 3 includes an end cover body 31, an assembling hole 32, a wire holding groove 33, a force reducing groove 34, a limiting portion 35, a first air groove 36, and a second air groove 37. Wherein the end cover body 31 includes an insertion portion 311 and an extending portion 312. The insertion portion 311 is substantially a cylindrical structure, and is mounted inside the battery sleeve 1. In this embodiment, an outer wall of the insertion portion 311 abuts against an inner wall of the battery sleeve 1, so that the insertion portion 311 is stably inserted inside the battery sleeve 1. The extending portion 312 is substantially a cylindrical structure too, and is positioned outside the battery sleeve 1. An outer diameter of the extending portion 312 is equal to an outer diameter of the battery sleeve 1, and a diameter of one end surface of the extending portion 312 near the battery 2 reduces to form the insertion portion 311. Another end surface of the extending portion 312 that is away from the battery sleeve 1 is an arc-shaped surface, and the arc-shaped surface further bends towards a direction that is away from the battery sleeve 1.

As shown in FIG. 3 and FIG. 4, the assembling hole 32 is defined in an end of the insertion portion 311 near the battery 2. The assembling hole 32 is substantially a circular hole, and the assembling hole 32 is coaxial with the insertion portion 311. The control module 4 is mounted inside the assembling hole 32. In this embodiment, a lamp (not shown) configured to simulate tobacco burning is mounted on an inner wall of the assembling hole 32 that is away from the battery sleeve 1. The lamp is connected to the control module 4. When the lamp works, the light generated by the lamp can simulate tobacco burning livingly. In other embodiments of the present application, the lamp can also generate lamplight of various colors. In use, the end cover 3 can generate various bright lamplight effects, and thus psychological action requirements of smokers can be met.

As shown in FIG. 3 and FIG. 4, at least one wire holding groove 33 is provided. The wire holding groove 33 is defined in an inner wall of the assembling hole 32, and is configured to enable the electronic wire 5 to pass through. In this embodiment, an inner end edge of the insertion portion 311 near the battery 2 defines a first opening (not labeled), and the first opening extends along an axial direction of the insertion portion 311 to form the wire holding groove 33. The inner end edge is an edge formed between an end surface of the insertion portion 311 near the battery 2 and the assembling hole 32. It can also be understood as that: the wire holding groove 33 is formed along the axial direction of the insertion portion 311, and the first opening of the insertion portion 311 is defined in the end surface of the insertion portion 311 near the battery 2. In this embodiment, the number of the wire holding groove 33 is one. The wire holding groove 33 can be a rectangular groove, a circular groove, or a reniform groove. In other embodiments of the present application, the structure of the wire holding groove 33 is not limited by above shapes. Since the end cover 3 uses the wire holding groove 33, when the control module 4 is mounted onto the end cover 3, the electronic wire 5 can be aligned with the wire holding groove 33. In the process of inserting the control module 4 into the assembling hole 32, the electronic wire 5 is received in the wire holding groove 33, and thus the electronic wire 5 can be effectively prevented from being squeezed and scraped by the control module 4 and the end cover 3. In this way, the electronic wire 5 is effectively protected from being damaged, and function's stability of the circuit of the battery assembly is ensured. When the end cover 3 is mounted onto the battery sleeve 1, since the electronic wire 5 is received in the wire holding groove 33, the electronic wire 5 can also be effectively prevented from being squeezed and scraped by the end cover 3 and the battery sleeve 1. Thus, the electronic wire 5 is protected from being damaged, and short-circuit and open-circuit of the circuit of the battery assembly are effectively avoided, so that the stable product quality of the battery assembly is improved.

As shown in FIG. 4 and FIG. 3, at least one force reducing groove 34 is provided, and the force reducing groove 34 is defined in the end of the insertion portion 311 near the battery 2. In this embodiment, the end surface of the insertion portion 311 near the battery 2 defines at least one opening (not labeled) running through the outer wall of the insertion portion 311 and communicating with the assembling hole 32, and the second opening extends along the axial direction of the insertion portion 311 to form the force reducing groove 34. The force reducing groove 34 is substantially a rectangular groove. Preferably, in this embodiment, the end cover 3 is provided with three force reducing grooves 34, and the three force reducing grooves 34 are equidistantly positioned on the outer wall of the insertion portion 311. By the use of the force reducing groove(s) 34, the end cover 3 can be easily inserted into the battery sleeve 1, and thus it is convenient to mount the end cover 3 on the battery sleeve 1. In other embodiments of the present application, the number of the force reducing groove(s) 34 can be changed. For example, the end cover 3 can also be provided with one or two force reducing groove(s) 34.

As shown in FIG. 3 and FIG. 4, the limiting portion 35 is configured to limit the position of the control module 4 in the assembling hole 32. The wire holding groove 33 runs through the limiting portion 35. The limiting portion 35 is substantially an annular structure, and protrudes from an inner wall of an end of the assembling hole 32 that is away from the battery 2. That is, the limiting portion 35 extends from the inner wall of the end of the assembling hole 32 that is away from the battery 2 to a central axis of the insertion portion 311. When the control module 4 is mounted inside the assembling hole 32, an end of the control module 4 that is away from the battery 2 abuts against the limiting portion 35.

As shown in FIG. 3 and FIG. 4, at least one first air groove 36 is provided and defined in an outer sidewall of the insertion portion 311, and at least one second air groove 37 is also provided and defined in an outer sidewall of the extending portion 312. The first air groove 36 and the second air groove 37 communicate with each other to form a channel configured to allow air to flow through, and air flow for actuating the control module 4 to work can flow through the channel. In this embodiment, each of the first air groove 36 and the second air groove 37 can be a rectangular groove, a circular groove, or a reniform groove, and the shape of the channel formed by the first air groove 36 and the second air groove 37 is substantially L-shaped. Since the end cover 3 uses the first air groove 36 and the second air groove 37, good ventilation effect of the battery assembly can be ensured.

As shown in FIG. 3, in this embodiment, a distance between the end surface of the end cover 3 near the battery 2 and the end surface of the control module 4 near the battery 2 is more than or equal to 1 mm. Preferably, the distance is equal to 1 mm. Due to the distance between the end surface of the end cover 3 near the battery 2 and the end surface of the control module 4 near the battery 2, when the end cover 3 is mounted on the battery sleeve 1, the control module 4 can be effectively prevented from being squeezed by the battery 2, so that the control module 4 is protected.

As shown in FIG. 3 and FIG. 9, an output end of the control module 4 is connected with the atomizing assembly 10 and can be used to control the atomizing assembly 10 to work. An airflow sensor (not shown) is mounted in the control module 4. When the battery assembly is connected with the atomizing assembly 10 and works normally, the control module 4 controls the battery 2 to supply electric power to the atomizing assembly 10 according to airflow signals sensed by the airflow sensor, and thereby controls the atomizing assembly 10 to generate smoke.

Figure 5:
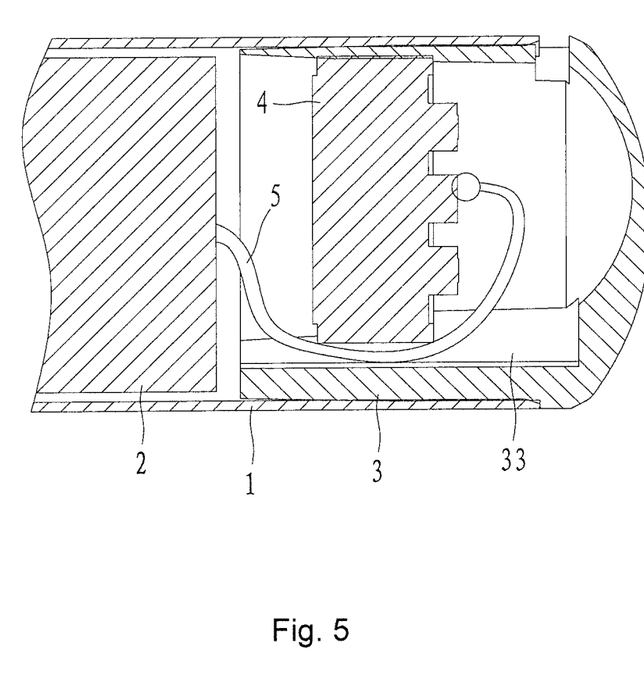
FIG. 5 is a structural diagram of a battery assembly according to a second embodiment of the present application.
Figure 6:
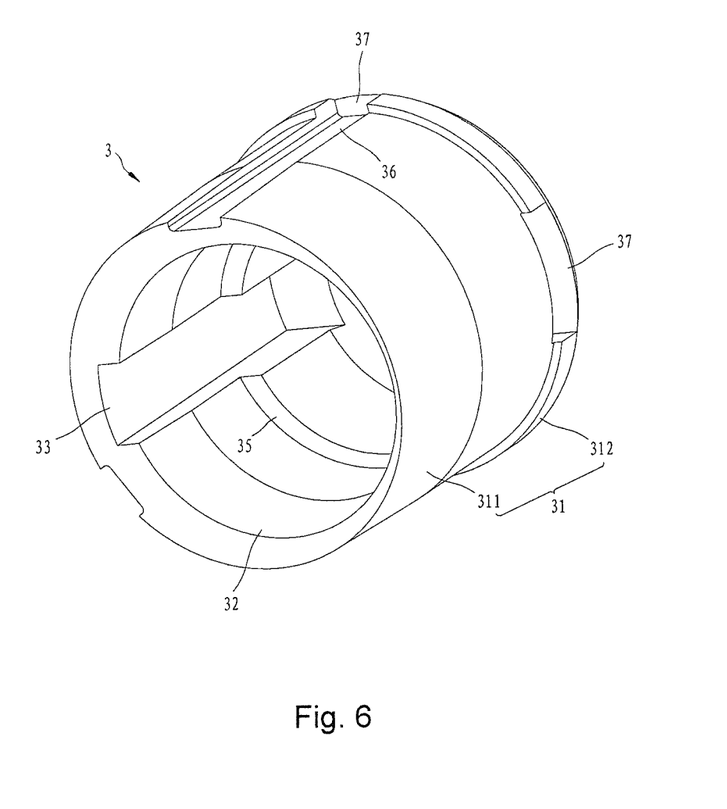
FIG. 6 is a perspective structural diagram of an end cover of the battery assembly shown in FIG. 5.

As shown in FIG. 5 and FIG. 6, a second preferred embodiment of the present application provides a battery assembly, which differs from the battery assembly of the first preferred embodiment in the position for defining the assembling hole 32 in the insertion hole 311 and the position for forming the wire holding groove 33 in the assembling hole 32. In this embodiment, the end cover 3 omits the force reducing groove(s) 34. A central axis of the assembling hole 32 deviates from a central axis of the insertion portion 311, that is, the assembling hole 32 is not coaxial with insertion portion 311. At least one wire holding groove 33 is defined in a part of an inner wall of the assembling hole 32 that has the shortest distance from the central axis of the insertion portion 311, that is, the at least one wire holding groove 33 is defined in a thick part of the insertion portion 311. Since the central axis of the assembling hole 32 deviates from the central axis of the insertion portion 311, it is convenient to define the wire holding groove 33 in the inner wall of the assembling hole 32. Due to this structure, although the sizes of the control module 4 and the end cover 3 are not increased, the wire holding groove 33 can be formed more deeply. Thus, the electronic wire 5 can be better protected, and can also be assembled conveniently.

Figure 7:
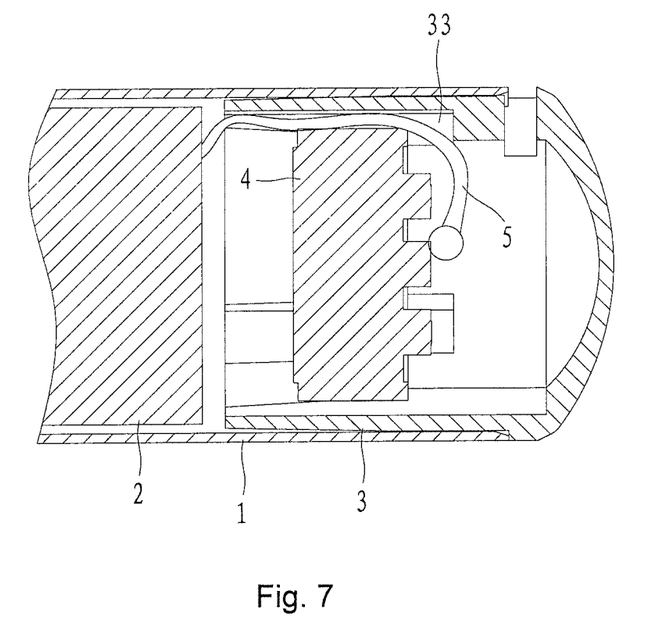
FIG. 7 is a structural diagram of a battery assembly of a third embodiment of the present application.
Figure 8:
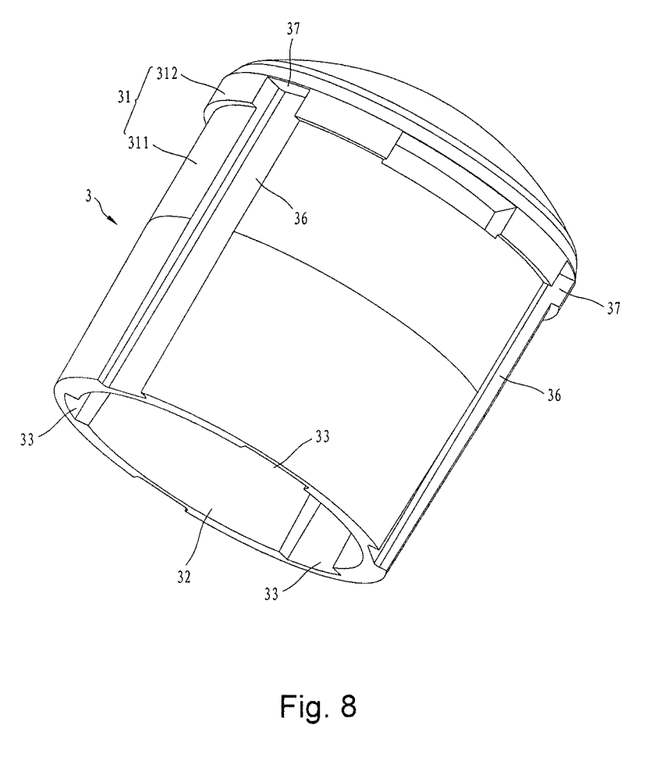
FIG. 8 is a perspective structural diagram of an end cover of the battery assembly shown in FIG. 7.

As shown in FIG. 7 and FIG. 8, a third preferred embodiment of the present application provides a battery assembly, which differs from the battery assembly of the first preferred embodiment in the number of the wire holding groove(s) 33. In this embodiment, the force reducing groove 34 on the end cover 3 is omitted. The number of the wire holding grooves 33 is three, and the three wire holding grooves 33 are equidistantly formed in an inner wall of the assembling hole 32. In other embodiments of the present application, the number of the wire holding groove(s) 33 can be changed. For example, the end cover 3 can also be provided with two or four wire holding grooves 33. By using a plurality of wire holding grooves 33, a plurality of electronic wires 5 can be received in the wire holding grooves 33 respectively, and squeeze between the electronic wires 5 can be reduced.

In any one of the aforementioned battery assemblies, the end cover 3 has a structure that includes at least one wire holding groove 33 defined in the inner wall of the assembling hole 32 and configured to enable the electronic wire 5 to pass through. In the assembly process of the end cover 3, the wire holding groove 33 is used to receive the electronic wire 5 and can effectively prevent the electronic wire 5 from being squeezed and scraped by the battery sleeve 1 and the end cover 3. In this way, open-circuit and short-circuit of the circuit in the battery assembly can be avoided, and the product quality of the battery assembly can be improved.

As shown in FIG. 3 and FIG. 9, based on the structures of the aforementioned battery assemblies, the present application further provides an electronic cigarette, which includes the atomizing assembly 10 and any one of the aforementioned battery assemblies. The atomizing assembly 10 includes an atomizing sleeve 11, which is integrally formed with the battery sleeve 1 or detachably connected with the battery sleeve 1. In this embodiment, the atomizing sleeve 11 is detachably connected with the battery sleeve 1, and the connection between the atomizing sleeve 11 and the battery sleeve 1 is a thread connection. The battery 2 is mounted inside the battery sleeve 1, and the end cover 3 is mounted on an end of the battery sleeve 1 that is away from the atomizing sleeve 11. In other embodiments of the present application, the atomizing sleeve 11 can also be detachably connected with the battery sleeve 1 by other methods, such as buckle connection.

Figure 10:
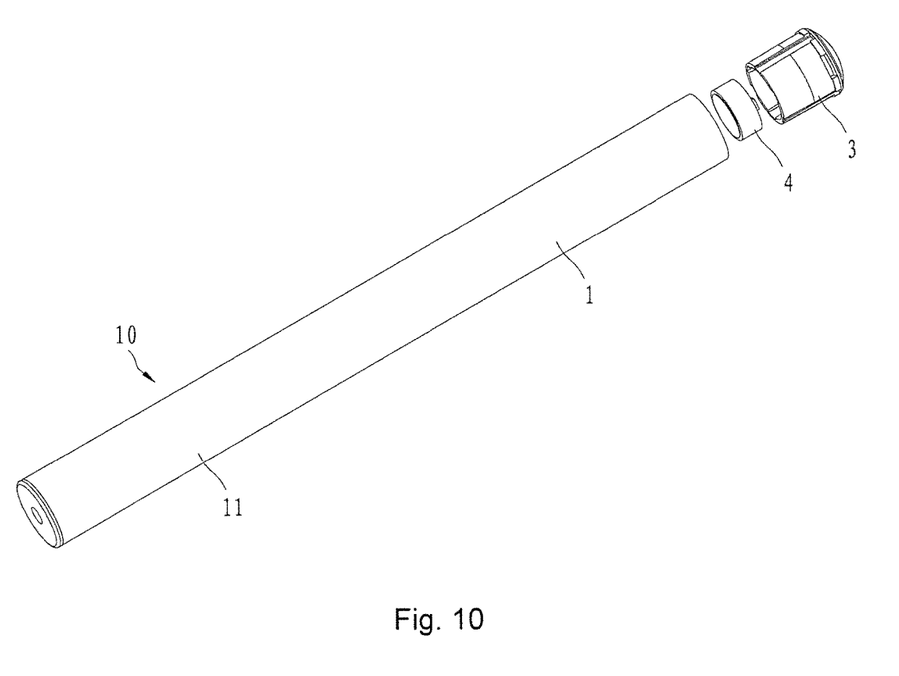
FIG. 10 is an exploded view of an electronic cigarette according to another preferred embodiment of the present application.

As shown in FIG. 10, another electronic cigarette is provided in another preferred embodiment of the present application, which differs from the electronic cigarette of the aforementioned embodiment in the structure of the battery sleeve 1. The electronic cigarette includes any one of the aforementioned battery assemblies and the atomizing assembly 10, and the battery sleeve 1 of the battery assembly is integrally formed with an atomizing sleeve 11 of the atomizing sleeve 10. In this embodiment, the electronic cigarette can be used as a disposable electronic cigarette.

Based on the structures of the aforementioned battery assemblies, the present application further provides a method for assembling any one of the aforementioned battery assemblies. The method includes the following steps:

S1: The electronic wire 5 is electrically connected between the battery 2 and the control module 4. Since a connecting pin of the battery 2 is mounted on an end of the battery 2 near the control module 4 and a connecting pin of the control module 4 is mounted on an end of the control module 4 that is away from the battery 2, when one end of the electronic wire 5 is electrically connected to the battery 2, the other end of the electronic wire 5 extends over an outer wall of the control module 4 and is electrically connected to the connecting pin of the control module 4.

S2: The electronic wire 5 is aligned with the wire holding groove 33, and the control module 4 is inserted into the assembling hole 32. In the process of inserting the control module 4 into the assembling hole 32, the electronic wire 5 is received in the wire holding groove 33 and can be effectively prevented from being squeezed and scraped by the control module 4 and the end cover 3.

S3: the assembled battery 2, the electronic wire 5, the control module 4, and the end cover 3 are assembled inside the battery sleeve 1 sequentially. In the method for assembling the battery assembly, the end cover 3 of the battery assembly has a structure that includes at least one wire holding groove 33 defined in the inner wall of the assembling hole 32 and configured to enable the electronic wire 5 to pass through, therefore, in the assembly process of the end cover 3, the wire holding groove 33 is used to receive the electronic wire 5 and can effectively prevent the electronic wire 5 from being squeezed and scraped by the battery sleeve 1 and the end cover 3. In this way, open-circuit and short-circuit of the circuit in the battery assembly can be avoided, and the product quality of the battery assembly can be improved.

While the embodiments of the present invention have been described with reference to the drawings, the present invention will not be limited to above embodiments that are illustrative but not limitative. It will be understood by those skilled in the art that various changes and equivalents may be substituted in the light of the present invention without departing from the scope of the present invention, and those various changes and equivalents shall fall into the protection of the invention.

What is claimed is:

1. A battery assembly configured to be connected with an atomizing assembly to form an electronic cigarette, the battery assembly comprising:
   a battery sleeve;
   a battery mounted inside the battery sleeve;
   an end cover mounted on an end of the battery sleeve;
   a control module configured to control the atomizing assembly to work; and
   an electronic wire electrically connected between the battery and the control module;
   wherein the end cover defines an assembling hole configured to mount the control module therein, and the end cover further defines at least one wire holding groove in an inner wall of the assembling hole and configured to enable the electronic wire to pass through; and wherein the end cover further includes a limiting portion protruding from an inner wall of an end of the assembling hole that is away from the battery, an end of the control module that is away from the battery abuts against the limiting portion, and the wire holding groove axially runs through the limiting portion along the inner wall of the assembling hole.

2. The battery assembly according to claim 1, wherein the end cover includes an end cover body, and at least one force reducing groove defined on end of the end cover body near the battery, and the assembling hole is defined in the end of the end cover body near the battery.

3. The battery assembly according to claim 2, wherein the end cover body includes an insertion portion mounted inside the battery sleeve, an end surface of the insertion portion near the battery defines at least one opening running through an outer wall of the insertion portion and communicating with the assembling hole, and the opening extends along an axial direction of the insertion portion to form the force reducing groove.

4. The battery assembly according to claim 1, wherein a distance between an end surface of the end cover near the battery and an end surface of the control module near the battery is more than or equal to 1 mm.

5. The battery assembly according to claim 1, wherein the wire holding groove is a rectangular groove, a circular groove, or a reniform groove.

6. The battery assembly according to claim 1, wherein the end cover includes an end cover body mounted on an end of the battery sleeve, the end cover body includes an insertion portion mounted inside the battery sleeve and an extending portion positioned outside the battery sleeve, and the assembling hole is defined in an end of the insertion portion near the battery.

7. The battery assembly according to claim 6, wherein the insertion portion is substantially a cylindrical structure, and the assembling hole is substantially a circular hole; a central axis of the assembling hole deviates from a central axis of the insertion portion, and the wire holding groove is defined in a part of an inner wall of the assembling hole that has a shortest distance from the central axis of the insertion portion.

8. The battery assembly according to claim 6, wherein the end cover further includes at least one first air groove defined in an outer sidewall of the insertion portion and at least one second air groove defined in an outer sidewall of the extending portion, and the first air groove and the second air groove communicate with each other to form a channel configured to allow air to flow through.

9. The battery assembly according to claim 8, wherein the channel formed by the first air groove and the second air groove is substantially L-shaped.

10. An electronic cigarette comprising a battery assembly and an atomizing assembly; wherein the battery assembly includes a battery sleeve, a battery mounted inside the battery sleeve, an end cover mounted on an end of the battery sleeve, a control module configured to control the atomizing assembly to work, and an electronic wire electrically connected between the battery and the control module;
wherein the end cover defines an assembling hole configured to mount the control module therein, and the end cover further defines at least one wire holding groove in an inner wall of the assembling hole and configured to enable the electronic wire to pass through; and
wherein the atomizing assembly includes an atomizing sleeve integrally formed with the battery sleeve or detachably connected with the battery sleeve, and the end cover is mounted on an end of the battery sleeve that is away from the atomizing sleeve.

11. The electronic cigarette according to claim 10, wherein the end cover includes an end cover body, and at least one force reducing groove defined on an end of the end cover body near the battery, and the assembling hole is defined in the end of the end cover body near the battery.

12. The electronic cigarette according to claim 10, wherein the end cover further includes a limiting portion protruding from an inner wall of an end of the assembling hole that is away from the battery, an end of the control module that is away from the battery abuts against the limiting portion, and the wire holding groove axially runs through the limiting portion along an inner wall of the assembling hole.

13. The electronic cigarette according to claim 10, wherein a distance between an end surface of the end cover near the battery and an end surface of the control module near the battery is more than or equal to 1 mm.

14. The electronic cigarette according to claim 10, wherein the wire holding groove is a rectangular groove, a circular groove, or a reniform groove.

15. The electronic cigarette according to claim 10, wherein the end cover includes an end cover body mounted on an end of the battery sleeve, the end cover body includes an insertion portion mounted inside the battery sleeve and an extending portion positioned outside the battery sleeve, and the assembling hole is defined in an end of the insertion portion near the battery.

16. The electronic cigarette according to claim 15, wherein the insertion portion is substantially a cylindrical structure, and the assembling hole is substantially a circular hole; a central axis of the assembling hole deviates from a central axis of the insertion portion, and the wire holding groove is defined in a part of an inner wall of the assembling hole that has a shortest distance from the central axis of the insertion portion.

17. The electronic cigarette according to claim 15, wherein the end cover further includes at least one first air groove defined in an outer sidewall of the insertion portion and at least one second air groove defined in an outer sidewall of the extending portion, and the first air groove and the second air groove communicate with each other to form a channel to allow air to flow through.

18. The electronic cigarette according to claim 17, wherein the channel formed by the first air groove and the second air groove is substantially L-shaped.

19. A battery assembly configured to be connected with an atomizing assembly to form an electronic cigarette, the battery assembly comprising:
a battery sleeve;
a battery mounted inside the battery sleeve;
an end cover mounted on an end of the battery sleeve;
a control module configured to control the atomizing assembly to work; and
an electronic wire electrically connected between the battery and the control module;
wherein the end cover defines an assembling hole configured to mount the control module therein, and the end cover further defines at least one wire holding groove in an inner wall of the assembling hole and configured to enable the electronic wire to pass through; and
wherein the end cover includes an end cover body mounted on an end of the battery sleeve, the end cover body includes an insertion portion mounted inside the battery sleeve and an extending portion positioned outside the battery sleeve, and the assembling hole is defined in an end of the insertion portion near the battery.

* * * * *